3,453,130
INORGANIC PIGMENTS
Raoul Feld, Cleethorpes, Grimsby, England, assignor to Laporte Titanium Limited, London, England, a British company
No Drawing. Filed June 8, 1965, Ser. No. 462,439
Claims priority, application Great Britain, June 10, 1964, 24,143/64
Int. Cl. C09c 1/36
U.S. Cl. 106—300   5 Claims

ABSTRACT OF THE DISCLOSURE

The invention relates to the treatment of pigment to improve the gloss and hiding power of a paint or lacquer in which the pigment is incorporated and to improve the dispersibility of the pigment in the paint or lacquer vehicle. The treatment agents are di-carbonyl compounds.

---

The present invention relates to pigment. More particularly, it relates to processes for treating pigment particles to improve the gloss and/or hiding power of a paint, lacquer, or other surface coating composition in which the pigment is incorporated.

Broadly, the process of the present invention comprises loading a mass of pigment particles with at least one certain organic additive compound containing a di-carbonyl group by contacting the particles with predetermined quantities of said additive compound while the latter is in a fluid state.

Preferably, the pigment comprises titanium dioxide in either the anatase or rutile form. If desired, it may comprise a composite pigment containing titanium dioxide or a colored pigment containing titanium dioxide. The anatase or rutile titanium dioxide may be pure or it may have small quantities of hydrated metal oxides such as hydrated alumina or an hydrated oxide of titanium present on the surfaces of the particles. Other pigmentary compounds that may be treated in accordance with the process of the invention include silica, blanc fixe, lithopone, barium carbonate, zirconia, zinc oxide, chrome yellow and phthalocyanine.

The additive compounds of this invention comprise organic compounds selected from the group consisting of

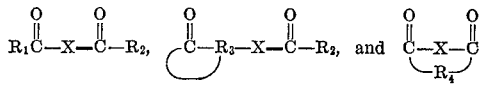

wherein $R_1$ and $R_2$ represent members selected from the group consisting of alkyl, alkoxy, aryl, aryloxy, aralkyl and aralkoxy;

$R_3$ represents a trivalent radical derived by the removal of three hydrogen atoms from a lower aliphatic hydro carbon nucleus;

$R_4$ represents a bivalent member selected from the group consisting of arylene and alkylene;

X represents a bivalent member selected from the group consisting of —N(H)— and —C(R)$_2$; and R represents a member selected from the group consisting of alkyl, aryl, aralkyl and hydrogen.

Examples of preferred compounds include, for example, acetylacetone, benzoylacetone, dibenzoyl methane, ethyl acetoacetate, diethyl malonate, phthalimide, succinimide and 2-acetyl cyclohexanone.

In practicing the process of this invention, the pigment particles are contacted with an additive compound which is normally liquid or with a solution or dispersion of the compound (whether solid or liquid) in a suitable solvent or other liquid vehicle such as, for example, an alcohol, acetone, water, or the like. While the pigment particles may be dry before the treatment, they preferably are premixed with water to form a paste, pulp or slurry.

After the pigment particles have been contacted with the additive compound, they preferably are exposed to heat at temperatures up to about 120° C. for a period of time sufficient to remove substantially all water, solvent or other liquid that might be associated with the pigment. Thereafter, the treated particles can be milled or otherwise processed to breakdown any agglomerates or clumps that may have formed.

Thorough mixing of the pigment particles, whether dry or in the form of an aqueous paste, pulp or slurry, with the additive compound is necessary to insure uniform treatment of all the particles.

Pigment treatment in accordance with this invention may be effected at various stages of the process of producing the titanium dioxide pigment particles. However, it is necessary that the treatment be carried out after any other processing treatment which would destroy the effect of the additive compound on the particles as herein described. Preferably, the treatment is effected during what is conventionally referred to as the treatment or finishing step in titanium dioxide producing plants. It has been determined that particularly satisfactory results are obtained by spraying, atomizing, or otherwise applying the desired quantities of the additive compound to the particles. If desired, the particles may be immersed in the additive compound while the latter is in a fluid state, drained and then dried. Moreover, the particles may be treated during the conventional wet milling operation during the production of the titanium dioxide pigment particles.

The quantity of additive compound with which the pigment particles are treated may vary within the range of from about 0.01% to 5.0% by weight, based on the weight of the pigment particles but preferably is within the range of from about 0.1% to 1.5%, by weight.

The invention also provides a pigment, the particles of which have been contacted with a compound as hereinbefore defined. Moreover, it provides a paint, lacquer or other suitable surface coating composition containing a pigment treated as hereindescribed.

Pigments treated in accordance with the invention have been incorporated with several different types of paint or lacquer media, for example, air-drying or stoving acrylic or alkyd media, and with each medium an improvement in the gloss and/or hiding power of the paint or lacquer formed has been observed. This is in contrast with other pigment treating processes which appear to impart only superficial improvement in gloss and/or hiding power when a particular type of medium is used.

To illustrate the invention even more fully the following specific examples are set forth. Unless otherwise indicated, all percentages given are by weight.

In the examples and table, the "percentage gloss" values set forth were obtained from measurements made using air-drying acrylic resin paints containing 37% by weight of the variously treated titanium dioxide pigment samples. In obtaining the values, the following procedure was used. A beam of light was shown on a black tile at an angle of incidence of 45°. The reflectance of that beam was measured. Films of the air-drying paints, containing the variously treated pigments, were applied to sheets of cellophane. A beam of light was shown on each of those films at an angle of incidence of 45°. In each instance, the reflectance of the beam was measured.

$$\frac{\text{Reflectance of the paint film}}{\text{Reflectance of the black tile}} \times 100\% = \text{Percentage Gloss}$$

In the examples and table, the "hiding power" values set forth were obtained from measurements made on several air-drying acrylic resin paints containing 37% by weight of the variously treated titanium dioxide pigment samples. The method used in obtaining the values is that described in the American Society for Testing Materials publication D1738–60T, issued in 1960, with the substitution of imperial gallons for U.S. gallons where appropriate. Any particular "hiding power" value represents the number of square feet of surface over which an imperial gallon of the paint can be uniformly spread to produce a contrast ration of $C=0.98$, the "contrast ratio" being defined in the ASTM publication.

In the examples and table, the "dispersibility" values were obtained in the following manner. 225 parts by weight of the variously treated pigment particles were mixed with 215 parts by weight of a linseed oil paint comprising pentaerythritol-modified alkyd resin, soya lecithin oil, and white spirits in the weight proportions of 100:20:570, respectively. During the mixing, samples of the paint were withdrawn at 1 minute intervals and tested on a Hegman gauge for fineness. The Hegman gauge reading gives a measure of the dispersion of the pigment in the medium. The rate of change of the Hegman gauge reading with time gives a measure of the rate of dispersion. After a certain time of mixing the Hegman gauge readings of the samples reach a constant maximum value. The "dispersibility" values given in the examples and table represent the specific Hegman gauge readings and the time which elapsed before the sample reached a constant maximum reading. A short period of time coupled with a high Hegman gauge reading indicates a good dispersibility and a high rate of dispersion.

EXAMPLE I

A sample of titanium dioxide pigment, in which hydrated titanium dioxide and hydrated alumina (in amounts of 1.75% and 2.0%, calculated as $TiO_2$ and $Al_2O_3$, respectively, based on the weight of titanium dioxide in the pigment) were present on the surfaces of the pigment particles, was mixed with water to form a pulp containing about 60% titanium dioxide. The pulp was mixed in a paste blender with 1% of acetylacetone (based on the weight of the pigment) for a few minutes to give an even distribution of the acetylacetone throughout the pulp. The pulp was then dried at a temperature of about 120° C. and the pigment was milled in a fluid energy mill.

The percentage gloss, hiding power and dispersibility values of the treated pigment (measured as hereinbefore described) are given in the table, below.

EXAMPLE II

Using another sample of the same pigment described in Example I, the procedure of that example was repeated using 1% of benzoylacetone instead of 1% acetylacetone. The benzoylacetone (a solid compound) was added to the pulp in the form of a solution in ethyl alcohol.

The percentage gloss, hiding power and dispersibility values for the treated pigment are set forth in the table, below.

EXAMPLE III

A sample of a titanium dioxide pigment, in which hydrated titanium dioxide and hydrated alumina (in amounts of 1.8% and 1.8%, calculated as $TiO_2$ and $Al_2O_3$, respectively, based on the weight of titanium dioxide in the pigment) were present on the surfaces of the pigment particles, was mixed with water to form a pulp containing about 60% of titanium dioxide. The pulp was mixed in a paste blender with 1% of dibenzoyl methane (based on the weight of the pigment) for a few minutes to give an even distribution of the dibenzoyl methane throughout the pulp. The pulp was then heated to a temperature of 120° C. after which the pigment was milled in a fluid energy mill. The dibenzoyl methane was added to the pulp in the form of a solution in acetone.

The percentage gloss and hiding power values for the thus-treated pigment are given in the table, below.

EXAMPLE IV

Using another sample of the pigment described in Example III, the procedure of that example was repeated using 1% of ethyl acetoacetate (not in solution) instead of 1% of dibenzoyl methane. The percentage gloss and hiding power values for that treated pigment are set forth in the table, below.

EXAMPLE V

Using still another sample of the pigment described in Example III, the procedure of that example was repeated using 1% of diethyl malonate (not in solution) instead of 1% of dibenzoyl methane. The percentage gloss and hiding power values for the pigment so treated are given in the table, below.

EXAMPLE VI

A sample of a titanium dioxide pigment, in which hydrated titanium dioxide and hydrated alumina (in amounts of 1.7% and 1.9%, calculated as $TiO_2$ and $Al_2O_3$, respectively, based on the weight of titanium dioxide in the pigment) were present on the surafces of the pigment particles, was mixed with water to form a pulp containing 60% by weight of titanium dioxide. The pulp was mixed in a paste blender with 0.25% of phthalimide (based on the weight of the pigment) for a few minutes to give an even distribution of the phthalimide throughout the pulp. The phthalimide was added to the pulp in the form of a solution in hot ethyl alcohol. The treated pulp was dried at a temperature of about 120° C. and the pigment was milled in a fluid energy mill.

The percentage gloss and hiding power values for the treated pigment are given in the table, below.

EXAMPLE VII

Another sample of the pigment described in Example VI was treated in accordance with the method of that example except that 0.5% of benzoylacetone (based on the weight of the pigment) in solution in ethyl alcohol was used instead of 0.25% of phthalimide. The percentage gloss, hiding power and dispersibility values for the thus-treated pigment are set forth in the table, below.

EXAMPLE VIII

Example VII was repeated, using 0.1% instead of 0.5% of benzoylacetone, all other details being the same. The percentage gloss, hiding power and dispersibility values for the treated pigment are shown in the table, below.

EXAMPLE IX

Example VII was repeated, using 0.5% of acetylacetone instead of the solution of benzoylacetone. Acetylacetone is a liquid and was therefore not used in solution. values for the pigment so treated are set forth in the table, below.

TABLE

| Example | Percentage gloss | Hiding power (sq. ft./Imp. gallon) | Dispersibility Hegman gauge reading | Time (mins.) |
|---|---|---|---|---|
| Untreated sample of pigment used in Examples I and II | 68 | 421 | 5.0 | 2 |
| Example I | 82 | 472 | 7.0 | 2 |
| Example II | 80 | 472 | 7.0 | 2 |
| Untreated sample of pigment use in Examples III, IV and V | 62 | 400 | | |
| Example III | 70 | 436 | | |
| Example IV | 65 | 414 | | |
| Example V | 77 | 436 | | |
| Untreated sample of pigment used in Examples VI, VII, VIII and IX | 66 | 421 | 6.0 | 3 |
| Example VI | 75 | 443 | | |
| Example VII | 80 | 464 | 7.0 | 3 |
| Example VIII | 70 | 464 | 6.0 | 2 |
| Example IX | 73 | 464 | 7.0 | 3 |

While the present invention has been described with respect to what, at present, are believed to be preferred embodiments thereof it will be understood, of course, that certain changes, substitutions and modifications may be made therein without departing from its true scope.

What is claimed is:

1. A process for the treatment of inorganic pigment particles which comprises contacting the particles with from about 0.1% to about 5.0% by weight, based on the weight of the pigment particles, of at least one organic additive compound while the latter is in a fluid state, and thereafter drying the particles, said additive comprising a compound selected from the group consisting of ethyl acetoacetate, diethyl malonate, phthalimide and succinimide.

2. A process as set forth in claim 1 wherein the pigment particles are premixed with water prior to being contacted with said organic additive compound.

3. A process as set forth in claim 1 wherein the pigment particles, after being contacted with said organic additive compound, are dried by heating the same to a temperature of about 120°.

4. A process as set forth in claim 1 wherein the pigment comprises a titanium dioxide.

5. A new article of manufacture comprising titanium dioxide pigment particles which have been contacted with from about 0.1% to about 5.0% by weight, based on the weight of the pigment particles, of a compound selected from the group consisting of ethyl acetoacetate, diethyl malonate, phthalimide and succinimide.

References Cited

UNITED STATES PATENTS

| 2,226,147 | 12/1940 | Sutton | 106—308 |
| 2,313,621 | 3/1943 | Bruson | 106—308 |
| 3,198,647 | 8/1965 | Kress | 106—308 |

TOBIAS E. LEVOW, *Primary Examiner.*

SAMUEL E. MOTT, *Assistant Examiner.*

U.S. Cl. X.R.

106—308